(12) United States Patent
Smith

(10) Patent No.: US 8,959,831 B2
(45) Date of Patent: Feb. 24, 2015

(54) INSECT TRAP

(76) Inventor: Colin Smith, West Sussex (GB)

( * ) Notice: Subject to any disclaimer, the term of this patent is extended or adjusted under 35 U.S.C. 154(b) by 321 days.

(21) Appl. No.: 12/865,513

(22) PCT Filed: Jan. 29, 2009

(86) PCT No.: PCT/GB2009/000250
§ 371 (c)(1),
(2), (4) Date: Feb. 18, 2011

(87) PCT Pub. No.: WO2009/095671
PCT Pub. Date: Aug. 6, 2009

(65) Prior Publication Data
US 2011/0138678 A1    Jun. 16, 2011

(30) Foreign Application Priority Data

Jan. 31, 2008  (GB) .................................. 0802217.0
Oct. 27, 2008  (GB) .................................. 0819676.8
Oct. 27, 2008  (GB) .................................. 0819677.6

(51) Int. Cl.
*A01M 1/10* (2006.01)
*A01M 1/02* (2006.01)
*A01M 1/14* (2006.01)

(52) U.S. Cl.
CPC *A01M 1/023* (2013.01); *A01M 1/14* (2013.01)
USPC .................... 43/123; 43/107; 43/114; 43/121

(58) Field of Classification Search
USPC ............................. 43/111, 107, 114, 121, 123
See application file for complete search history.

(56) References Cited

U.S. PATENT DOCUMENTS

| 4,106,478 | A | * | 8/1978 | Higashijima | .................... 149/15 |
| 4,168,591 | A | | 9/1979 | Shaw | |
| 4,649,895 | A | * | 3/1987 | Yasuki et al. | ............ 126/263.05 |
| 5,119,586 | A | * | 6/1992 | Townsend | ........................ 43/114 |
| 5,258,176 | A | | 11/1993 | Keenan | |

(Continued)

FOREIGN PATENT DOCUMENTS

| JP | 05262601 | 10/1993 |
| SU | 525476 A1 | 8/1976 |

(Continued)

OTHER PUBLICATIONS

Bedbugger forum from Dec. 2007, handwarmers or heat packs as a heat source in DIY bed bug traps: http://bedbugger.com/forum/topic/bed-bugs-heat-038-carbon-dioxide-red-led-light.

(Continued)

*Primary Examiner* — Darren W Ark
*Assistant Examiner* — Timothy Schwarz
(74) *Attorney, Agent, or Firm* — Rader, Fishman & Grauer PLLC

(57) ABSTRACT

The invention relates to an insect trap (10), which mimics certain characteristics of a mammal and comprises a housing comprising a base (22) and a cover (24). The pad generates an infrared heat source (14) and can also generate water vapour (16). The trap has an insect retention surface (18) and is characterized in that the cover is positioned over the base in a manner such that it defines an opening (50) around the base/cover interface (52). The opening has a depth (d) of less than 1.5 cm and is sized and positioned such that at least one attractant signal (14', 16') is directed out of the opening in a manner allowing effective operation for at least 8 hours.

20 Claims, 15 Drawing Sheets

(56) References Cited

U.S. PATENT DOCUMENTS

| | | | |
|---|---|---|---|
| 6,618,983 B1* | 9/2003 | Spragins | 43/107 |
| 6,618,984 B1 | 9/2003 | Li | |
| 6,860,062 B2* | 3/2005 | Spragins | 43/121 |
| 2001/0042546 A1* | 11/2001 | Umeda et al. | 128/206.21 |
| 2006/0260183 A1 | 11/2006 | Hockaday | |
| 2007/0044372 A1* | 3/2007 | Lang et al. | 43/114 |
| 2008/0283038 A1* | 11/2008 | Dodo | 126/263.06 |
| 2008/0305447 A1* | 12/2008 | Wheeler et al. | 432/29 |
| 2010/0275505 A1* | 11/2010 | Kagawa | 43/107 |
| 2011/0121033 A1* | 5/2011 | Horne et al. | 222/145.1 |

FOREIGN PATENT DOCUMENTS

| | | |
|---|---|---|
| WO | WO-98/11775 A1 | 3/1998 |
| WO | WO-99/35908 A1 | 7/1999 |
| WO | WO-00/03594 A1 | 1/2000 |
| WO | WO-2006/121346 A1 | 11/2006 |

OTHER PUBLICATIONS

Potter 2005 A bed bug state of mind. PCT. "Since warmth attracts bed bugs, some companies are experimenting with heating pads with or without glue boards", http://www.pctonline.com/Article.aspx?article_id=38355.

Handwärmer: Warme Hände, heisser Kopf. Prof. Dr. Bützer. Pädagogische Hochschule St. Gallen, Dec. 2003 http://www.swuisseduc.ch/chemie/schwerpunkte/waermebeutel/docs/waermebeutel.pdf.

International Search Report, Feb. 24, 1999.

Search report for corresponding application GB-0819676.8, Mar. 9, 2009.

English abstract for JP-05262601, Oct. 12, 1993.

Search report for corresponding application GB-0819677.6, Mar. 9, 2009.

\* cited by examiner (Graph 2.1)

(Graph 2.2)

(Graph 2.3)

(Graph 2.4.1)

Graph 2.4.2

Graph 2.4.3

INSECT TRAP

CROSS-REFERENCES TO RELATED APPLICATION

This application is a US National Phase which claims the benefit of International Application No. PCT/GB2009/000250, filed on Jan. 29, 2009, which claims the priority of GB0802217.0, filed Jan. 31, 2008, GB0189677.6, filed Oct. 27, 2008, and GB0189676.8, filed Oct. 27, 2008, all of which are hereby incorporated by reference in their entirety.

TECHNICAL FIELD

The present invention relates to an insect trap and more particularly to an insect trap for small biting insects, particularly bed bugs (*Cimex lectularus*, and *Cimex hemipterus*), ticks and fleas.

BACKGROUND OF THE INVENTION

There are two main species of bedbugs:
*Cimex lectularius* (common bed bug); and
*Cimex hemipterus* (tropical bed bug).
They appear to share the same behaviour patterns.

Bed bugs are parasites that preferentially feed on humans. They are a persistent pest and have developed a number of highly evolved abilities to remain close to humans. However, when humans are not available they will feed on other warm blooded animals such as rodents and birds.

Bed bugs were common in the UK prior to World War II, after which time widespread use of synthetic insecticides such as DDT greatly reduced their numbers. At one stage in the 1930's 25% of all homes in the UK were infested.

In the past decade, bed bugs have begun making a comeback across the world. Although they are not considered to be a major pest or health hazard they can be highly unpleasant to live with and can cause a severe lack of sleep. International travel and commerce are thought to facilitate the spread because eggs, young, and adult bed bugs are readily transported in luggage, clothing, bedding, and furniture. Bed bugs can infest aircraft, ships, trains, and buses. Bed bugs are most frequently found in dwellings with a high rate of occupant turnover, such as hotels, motels, hostels, dormitories, shelters, apartment complexes, tenements, and prisons. Adult bed bugs are brown to reddish-brown, oval-shaped, flattened, and about 0.4 cm to 0.45 cm long. Their flat shape enables them to readily hide in cracks and crevices.

Female bed bugs lay from one to twelve eggs per day, which are deposited on rough surfaces or in cracks and crevices. The eggs are coated with a sticky substance so they adhere to the substrate. Eggs hatch in around 10 days, and nymphs can immediately begin to feed. They require a blood meal in order to moult and develop into the next stage. Bed bugs reach maturity after five moults. Developmental time (egg to adult) is affected by temperature and takes about 21 days at 30° C. to 120 days at 18° C. The nymphal period is greatly prolonged when food is scarce. The adults' lifespan may be as much as 12-18 months and they are known to be able to survive for 12 months between feeds.

Bed bugs are fast moving insects that are nocturnal blood-feeders using a barbed spike to penetrate the skin by repeatedly hammering at the surface. Nymphs may become engorged with blood within three minutes, whereas a full-grown bed bug usually feeds for ten to fifteen minutes. They then crawl away to a hiding place to digest the meal. A full meal may take 3 or 4 days to digest.

Bed bugs hide during the day in dark protected sites; they prefer fabric, wood, and paper surfaces. They usually occur in fairly close proximity to the host, although they can travel relatively large distances. Bed bugs initially can be found in seams, and folds of mattresses, later spreading to crevices in the bedstead. In heavier infestations, they also may occupy hiding places further from the bed. They may hide in window and door frames, electrical boxes, floor cracks, baseboards, furniture, and under the tack board of wall-to-wall carpeting. Bed bugs often crawl upwards to hide in pictures, wall hangings, curtain pleats, loosened wallpaper, cracks in plaster, and ceiling mouldings.

There are many different insect traps and approaches to capturing small biting insects and they range widely in design.

A bed bug monitor trap is disclosed in US 20070044372. The main embodiment described discloses a trapping device comprising a corrugated layer and a first glue board, configured to immobilise insects, which is attached to the ridges of the corrugated layer. In a second embodiment there is disclosed a trapping device comprising a base and a lid covering the base defining a trap interior, a heating device provided within the trap and an adhesive surface provided within the trap interior.

The detailed description describes different attractant mechanisms including:
Pheromones;
Food attractants;
Tactile cues; and
Olfactory attractants.

Whist under each heading a wide variety of options are considered, the application does not teach any benefit in making particular selections.

Thus, tactile cues include:
Textured materials;
Materials with a low heat transfer;
Vibration;
Heat (including radiant or infrared) and
Humidity.

Other patent publications of interest include the following:
U.S. Pat. No. 4,168,591 which discloses an apparatus and method for attracting and killing mosquitoes and other similar insects. It teaches using heat and moisture as attractants. The apparatus comprises a heating coil which generates heat and helps generate moisture from a sleeve filled with water.

WO 00/03594 and WO 99/35908 both of which disclose insect killing systems optimized for mosquitoes which simulate the breathing and body heat from animals. Both use heat generating elements and a supply of liquid.

SE 535476 also discloses an insect trap which utilises water and heat to attract insects.

It is an aim of the present invention to provide a simple effective trap for small biting insects which does not have the disadvantages associated with the traps described, namely the provision of water in liquid form and an electrical source for heating. A separate and independent aim was to develop a purpose made chemical heat pad, which in addition to generating heat additionally generated moisture. In this regard commercially available head pads, for use as e.g. hand warmers, have not been designed to generate water vapour as well as heat.

PRESENT INVENTION

According to a first aspect of the present invention there is provided an insect trap (10), which mimics certain characteristics of a mammal, and comprises:

a housing comprising a base (22) and a cover (24) containing
   a heat means (12), which is capable of generating an infrared heat source (14);
   a means of generating water vapour (16); and
   an insect retention surface (18) characterized in that
      the cover is positioned over the base in a manner such that it defines an opening (50) around the base/cover interface (52),
         the opening has a depth (d) of less than 1.5 cm; and
         the opening is sized and positioned such that at least one attractant signal (14', 16') is directed out of the opening in a manner allowing effective operation for at least 8 hours.

More preferably, the trap allows effective operation is for at least 12 hours and most preferably about 24 hours.

Effective operation is achieved by generating and maintaining a temperature of about 25° C. or above and/or a humidity above ambient and typically greater than 50% for a period sufficient to attract and trap insects. Such a period is preferably at least 8 hours.

In one embodiment the effective operational period is increased by first generating an effective temperature and then, as the temperature drops, increasing the relative humidity.

Preferably the opening extends around the perimeter of the trap. The opening may be a large elongate opening or it may comprise a plurality of smaller openings regularly or irregularly disposed around the perimeter. The smaller openings may take the form of pores, channels or gaps which are of a size which allow the insects to enter the trap. In a preferred embodiment the smaller openings are disposed between upstarts or hair like structures which project upwardly around the perimeter of the base.

According to a second aspect of the present invention there is provided a packaged chemical heat pad (100; 12), for an insect trap (10), comprising:
   an air tight protective packaging (110) surrounding a chemical heat pad, (120) which chemical heat pad comprises:
      a semi-permeable membrane (130); filled with
      chemicals (140), which on activation by oxygen, following the removal of the protective packaging (110), cause both heat, including infrared heat, and water vapour to be generated such that over at least an 8 hour operating span the pad surface temperature is substantially maintained at between 40° C. and 20° C. and the relative humidity is maintained at a level at least 10% higher than the prevailing humidity.

Indeed, the relative humidity may be maintained at a level at least 20%, through 30% or more than the prevailing humidity. Preferably the relative humidity is greater than 50%, more preferably greater than 60%, through 70% and 80%.

The operating span is preferably at least 8 hours, more preferably at least 12 hours and may desirably be about 24 hours.

In a preferred embodiment the chemicals comprise: Iron powder; activated carbon, sodium chloride and a source of water which may, for example, be "bound" as water of crystallization. The skilled chemist will however appreciate that other chemicals can be used to achieve the defined performance characteristics—an exothermic reaction generating the release of heat and sufficient water vapour for the given time and purpose.

Preferably, the packaged chemical heat pad comprises, by weight, at least 21% of a source for generating water (as vapour). This may, for example, be a hydrated salt wherein the water is "bound" as water of crystallization. The source of water may comprise, by weight, at least 30% and as much as 50% of the pad weight.

The chemical heat pad should, on activation, generate both effective levels of heat and moisture. Indeed, this proved to be a challenge, and it was found that the preferred profile for attracting bed bugs, was one in which the heat dissipated, and moisture generated, graphically resembled two intersecting sine waves, substantially as illustrated with reference to FIG. 14a.

According to a third aspect of the present invention there is provided an insect trap (10), which mimics certain characteristics of a mammal, and comprises:
   a heat means (12);
   a means of generating water vapour (16); and
   an insect retention surface (18);
characterized in that said heat means is a chemical heat pad which, when activated, is capable of generating both:
   an infrared heat source (14); and
   water vapour.

In a favoured embodiment a microclimate enhancing surround is disposed about the heat pad. It serves to more closely mimic, for example the hairs of a small mammal and offers a number of benefits over and above a traditional housing.

Preferably, the cover member is made of an insulating material, such as polystyrene. The selection of material means a cold surface which can cause condensation can be avoided.

The surround may partially or completely enclose or envelop the heat means.

The preferred chemical heat means comprises chemicals which on activation will undergo an exothermic reaction generating sufficient heat (including infra red) to mimic a mammal and will additionally generate water vapour humidifying the local environment. The heat means ideally generates a surface temperature of about 25° C. for a period sufficient to attract the biting insects towards the heat means. An ideal period is at least two hours and more preferably at least 8 hours. Obviously, the longer the period that the heat is maintained the better. The heat should include an infrared heat.

The applicant has found that it is particularly desirable to use as the chemical heat means one which comprises a semi-permeable membrane and contains chemicals which in addition to generating heat generate water which is vaporised by the heat generated to give off water vapour and thereby humidify the trap environment. The semi-permeable membrane thus mimics a mammal's skin and the area immediately surrounding the heat means is humidified. Preferably, a microclimate enhancing surround is placed over or around the heat means to enhance this effect. The surround may comprise an open structure comprising e.g. pores, channels or other openings or hair like structures (of a size sufficient to provide access to the insects to be trapped). In either case the surround can provide an insulating function, control humidity, provide an insect hiding place and allow infra red radiation to be emitted from the heat means.

The combination of heat (including infrared) and humidity has been found by experiment to be particularly efficient at attracting biting insects. The simplicity of the device means a cheap disposable trap can be cost effectively produced. The avoidance of liquid water as the humidifying source is also advantageous.

In this regard, blood-sucking insects have special sensory structures that can detect infrared emissions, and are used by them to home in on their hosts.

Depending on the surround material chosen, it is also possible to provide a degree of insulation, thus prolonging the effective operational time of the trap. The material can also provide surface characteristics which can be used to attract the biting insects i.e. a rough surface.

Furthermore, the voids, spaces and channels or space between adjacent hairs or hair like structures can be impregnated with further water to enhance the humidifying effect (or to produce a humidifying effect where a chemical heat means, which does not emit water vapour is used). As well, or in the alternative, the voids, spaces and channels or space between adjacent hairs or hair like structures may be impregnated with e.g. an insect capture adhesive and or insecticide. In a particularly favoured embodiment the insect capture adhesive is provided in the pores towards a surface facing the chemical heat means. In such circumstances the casing may comprise a sandwich in which an inner-casing is impregnated with adhesive and an outer-casing is not. In such an embodiment the outer casing can be easily handled and caught insects will not be immediately visible, but can be viewed by for example removing the outer shell. Variations on the theme will be apparent to one skilled in the art.

The various aspects of the invention will be described further, by way of example, with reference to the following figures and Examples in which.

Figure 12:
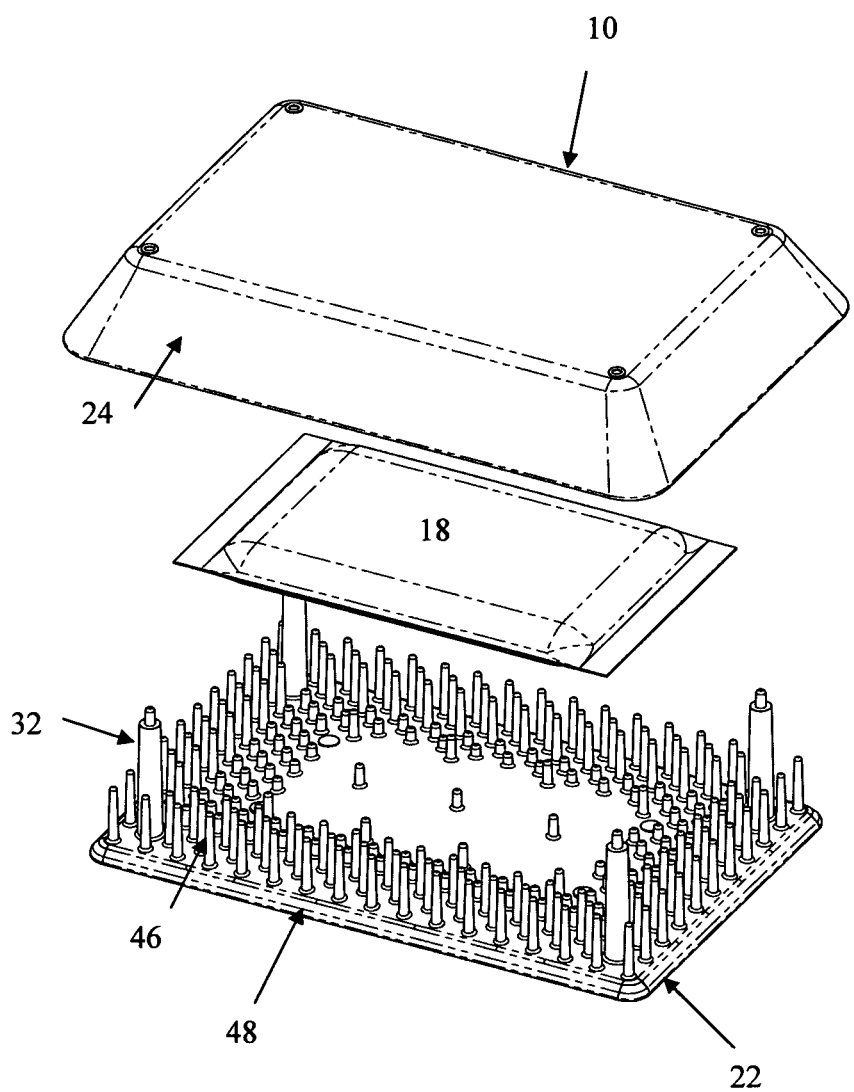
FIG. 12 illustrates a best mode variation in which the trap comprises a brush-like base which in combination with an insulating cover member creates a "broken focus gap" about the traps perimeter.
Figure 13A:
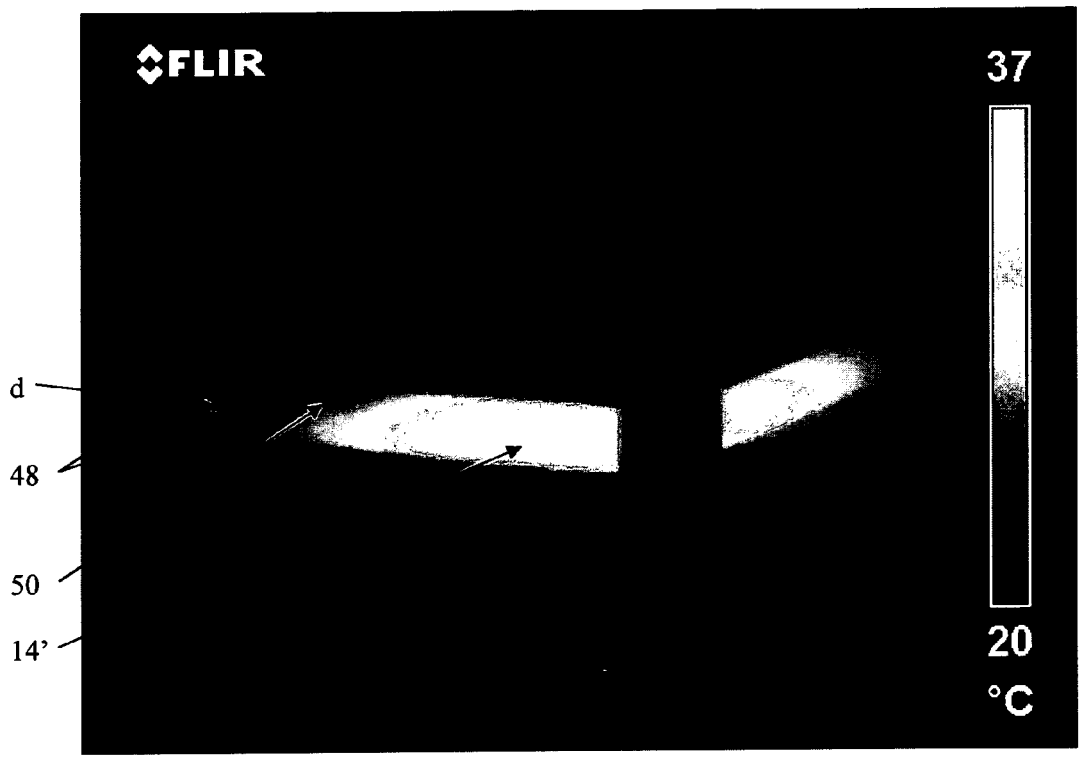
Figure 13B:
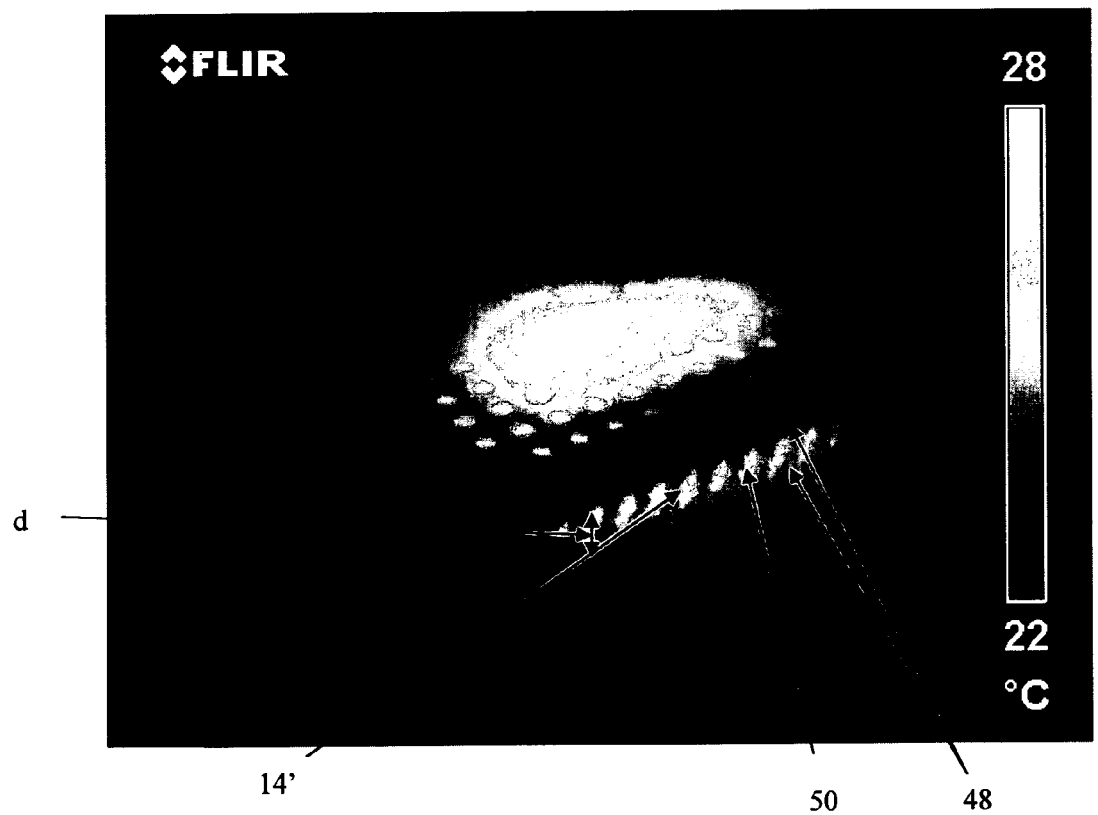
Figure 13C:
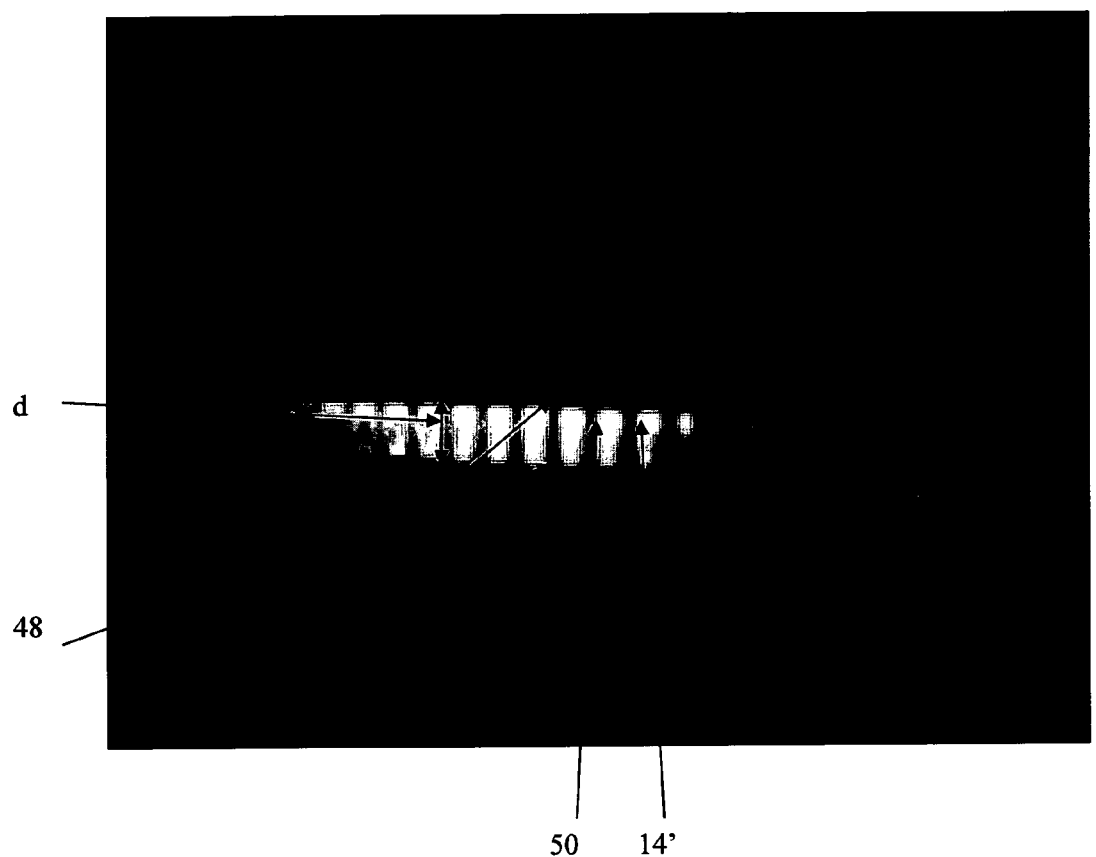
Figure 14A:
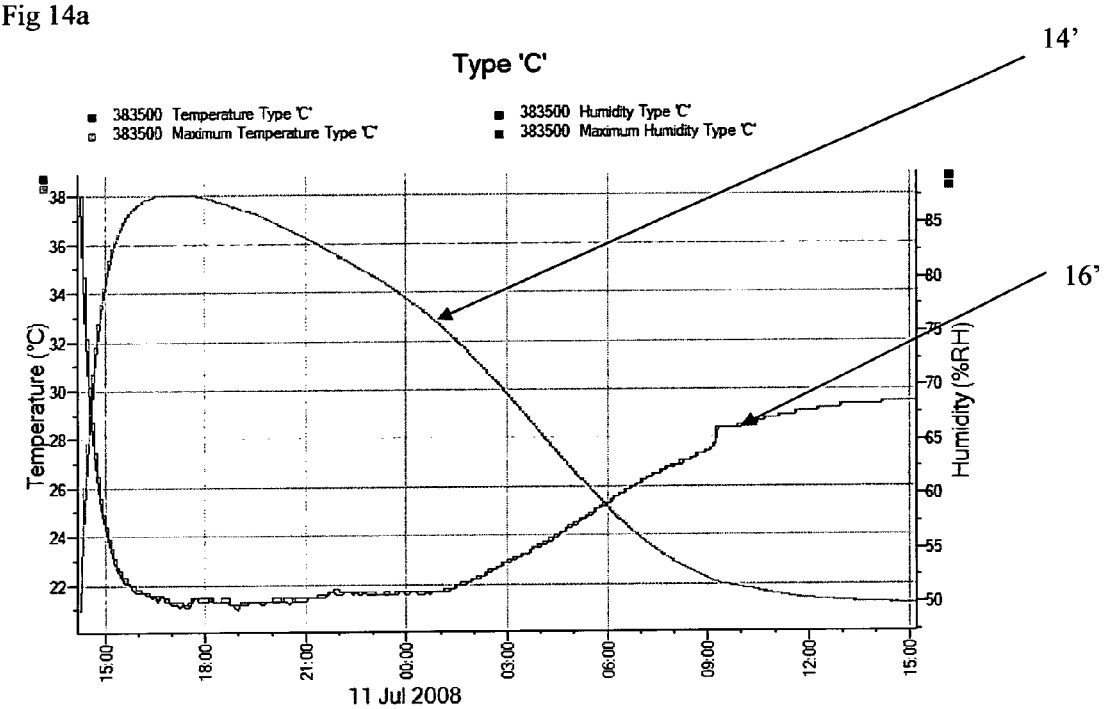
Figure 14B:
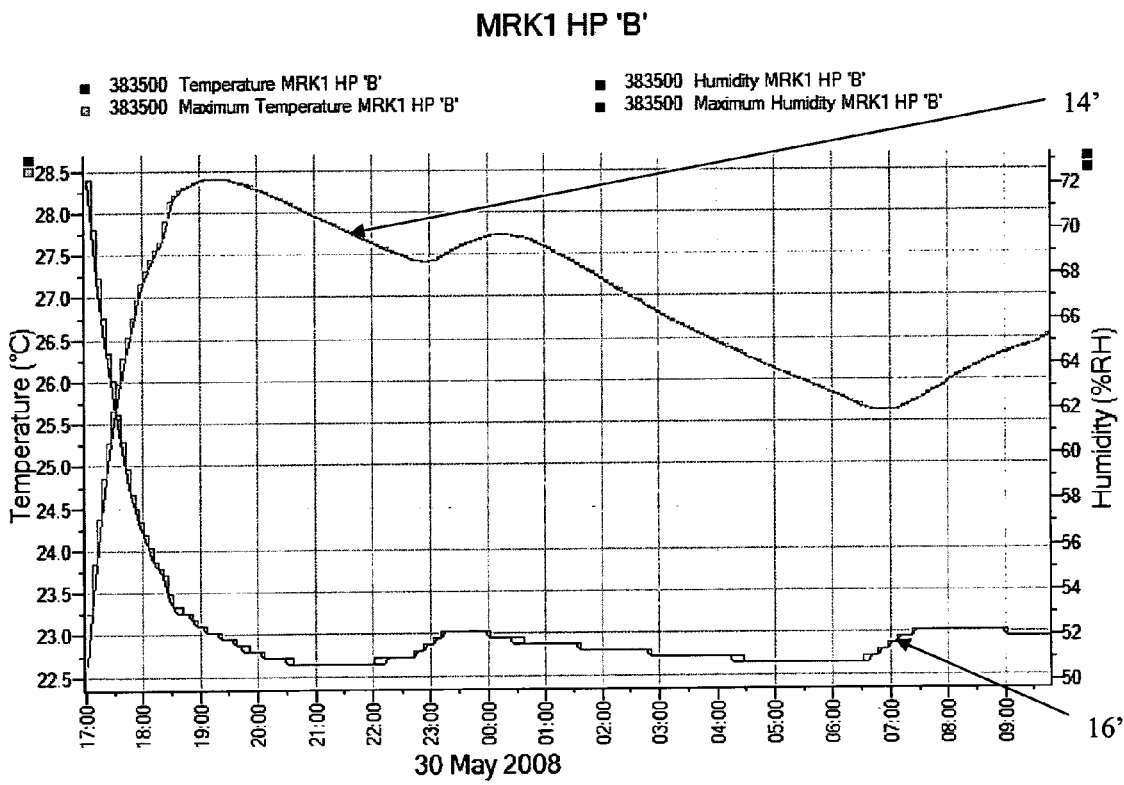

FIGS. 13a-c are pictures showing the infra red signatures emitted from different devices (MK1, MK5 and MK9 respectively) with the heat pad activated and in which FIG. 13c is the device of FIG. 12;

FIG. 14a is a temperature humidity graph for the device of FIG. 12 with a head pad (Example 4) according to the invention, and FIG. 14b is a temperature humidity graph for the device of FIG. 12 with a prior art heat pad (Example 4) of similar dimensions.

DETAILED DESCRIPTION

Example 1

Figure 1:
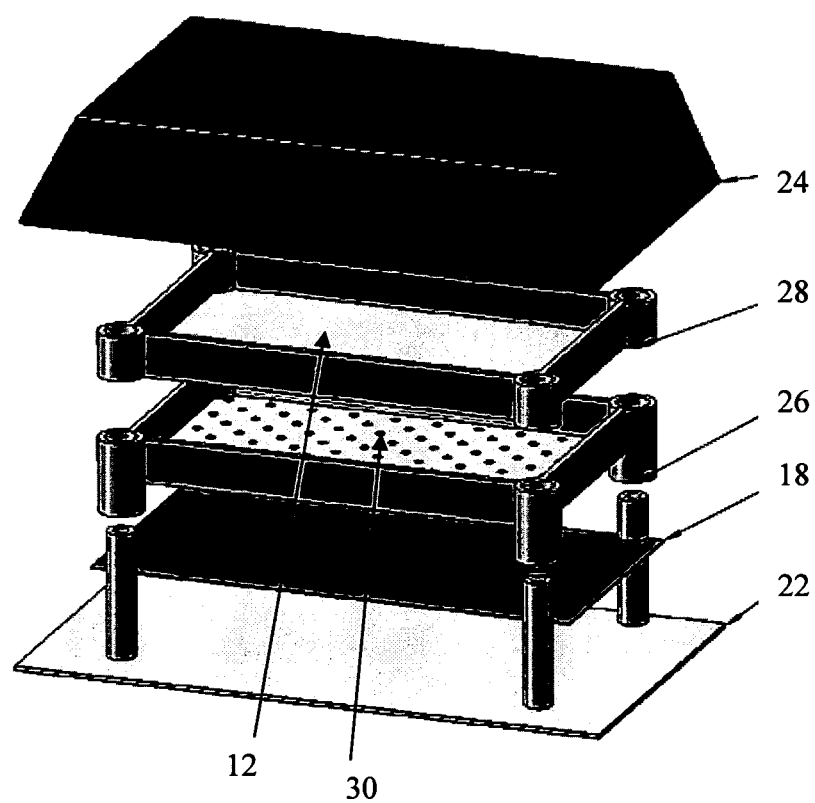
FIG. 1 is an exploded perspective view of a prototype MK1 trap according to one aspect of the present invention.

In this example, the principle of creating a simple, cost effective trap which mimics a small mammal was evaluated using a simple prototype device as described with reference to FIG. 1. The device (10), comprises a housing (20) having a base (22), and a cover (24). An insect retention surface (18) is provided in the form of a glue board which is disposed on the base, and two trays (26; 28) are arranged above the insect retention surface. They are respectively a first tray (26) for supporting an auxiliary means or pad (30) for generating water vapour (16) and a second tray (28) for supporting a heating means (12).

The heating means used was a chemical heating means in the form of a 34 g 'Hot Pad' manufactured by SJC Corp, Korea.

The Hot Pad contains a mixture of iron dust, activated charcoal powder, cellulose, zeolite, sodium chloride and moisture (bound). This is packaged in a semi-permeable 80 mm×50 mm×10 mm sachet. The sachet is packed in a slightly larger outer sachet which is fabricated from a hermetically sealed oxygen barrier film. The pad automatically activates once the outer sachet is opened as atmospheric oxygen enters the sachet through the semi permeable membrane and reacts with the virgin iron dust which has been excluded from contact with air since its manufacture.

The oxygen oxidises the iron and the process is exothermic thereby generating heat. The sodium chloride acts as a catalyst. Once the reaction starts, heat is generated and the reaction continues until all the iron is converted. Under normal circumstances, the reaction of the unpackaged formulation is quite fast and high temperatures can be achieved in a short time. However the inclusion of other materials such as charcoal and zeolite controls and slows the rate of reaction making the pads suitable for the present application. Water present as e.g. water of crystallization is emitted as water vapour following heating.

Packaging the mixture in a semi-permeable sachet further controls the reaction rate, by slowing the ingress of oxygen. This combination has been specifically developed by the manufacturer to warm hands, by conduction, for up to 8 hours at a fairly constant rate.

The reaction is; $4Fe+3O_2 \rightarrow 2 Fe_2O_3$. In separate reactions, some water is also released due to bound water evaporating from some of the other components present which include cellulose, zeolite and sodium chloride.

In use the bag was activated and placed on the second tray (28). If additional humidity was desired a damp pad (30) was placed on the first tray (26).

The prototype test device was used to evaluate the effectiveness of using a chemical heat means as an attractant to bed bugs. The chemical heat means was selected because it did not require electrics (or battery power) for operation and because it generated both heat, including infrared heat (confirmed using a thermal imaging camera) and water vapour— all insect attractants. Thus, the applicant hypothesised this combination of attractants could be developed into a simple, cheap and effective biting insect trap.

The efficacy of the device was tested against the Common bed bug, *Cimex lectulariusas*, as set out below. It will be appreciated that such a device could be used as a trap for other insect types.

Testing Methodology

The protocol was as follows:

Activate the pad when ready to begin the test. Once the heat pad has been opened it will produce heat for approximately 8 hours.

Observation on the number of bed bugs attracted to the prototype device were made at hourly interval up to six hours and then again at 12 hours after introducing the prototype device into the testing arena. Observations on the number of bed bugs caught on the glue board were made only at the interval of three hours to avoid frequent disturbance to the bed bugs.

The results are given in Table 1 below:

TABLE 1

Evaluation of efficacy of prototype device against Common bed bug *Cimex lectularius*

| Frequency of observations (hours) | Treatment (With heat and moisture) | | | | Control (Without heat and moisture) | | | |
|---|---|---|---|---|---|---|---|---|
| | No. attracted | Percent attracted | No. caught | % caught | No. attracted | Percent attracted | No. caught | % caught |
| 01 | 01 | 05.00 | NA | NA | 00 | 00.00 | NA | NA |
| 02 | 12 | 60.00 | NA | NA | 01 | 05.00 | NA | NA |
| 03 | 13 | 65.00 | 11 | 55.00 | 02 | 10.00 | 00 | 0.00 |
| 04 | 13 | 65.00 | NA | NA | 04 | 20.00 | NA | NA |
| 05 | 13 | 65.00 | NA | NA | 04 | 20.00 | NA | NA |
| 06 | 13 | 65.00 | 12 | 60.00 | 04 | 20.00 | 02 | 10.00 |
| 12 | 17 | 85.00 | 12 | 60.00 | 14 | 70.00 | 02 | 10.00 |

Release 20 healthy, hungry female common bedbugs (*Cimex lectularius*) into a Petri dish (approximately 5 cm diameter×0.5 cm high).

Place a layer of felt or blotting paper in the dish to ensure that the insects can escape.

Place the dish in a suitable, secure, test arena, such as a plastic tank or aquarium, measuring approximately 35 cm×25 cm×20 cm.

Place the prepared monitor in the centre of the arena and place the tank in a dark room or alternatively place the tank in a light tight box.

Maintain the test area at ambient temperature and humidity.

After 24 hours remove the monitor and count the number of insects caught.

The experiment was monitored with an infra red video monitor linked to a suitable hard drive with the video camera set at a height of approximately 30 cm above the test arena. The whole arena should be in frame. Once the experiment begins the camera should be activated to record for a 24 hour period.

Reviewing the activity will be achieved by 'fast forwarding' to study the movement, if any, of the test insects. The results can be recorded as hourly observations.

The experiment was conducted against a control as per the protocol. It was carried out in a dark room. Temperature and relative humidity during the testing period ranged between 20° C. and 23° C. and 53% and 55%, respectively.

Twenty pre-starved adult female bed bugs were released onto folded paper and placed inside the testing arena at one end. The prototype trap (as per FIG. 1) was placed in the testing arena opposite to the bed bugs and the chemical heating means was activated.

Observations were made on the number of bed bugs attracted towards the prototype device, (i.e. those present inside the device but not caught on the adhesive surface) and those caught.

The preliminary laboratory findings clearly indicated a significant difference in terms of number of bed bugs caught (and the speed of capture) by the prototype device using as attractants heat (including infrared) and humidity vs control.

To further explore the capability of a chemical heat means to generate heat (including infrared) at an appropriate temperature and for an appropriate period and the ability to generate water vapour a series of further experiments were undertaken and these are described in Example 2 below:

Example 2

The first part of the experiment was undertaken to gain a fuller understanding of the complexities, of the chemical reaction. Earlier trials had shown that the location of temperature reading points varied significantly. A reading taken on the surface of the reaction sachet is significantly less than one taken inside the reaction. Typically, temperatures of about 25° C. can be achieved on the surface. When taken in the core, using a probe thermometer, a constant temperature of up to 55° C. is often recorded, depending on the conditions of the test.

The objective of the applicant was to generate a trap which relatively closely simulates a mammal in terms of a number of parameters. The normal internal body temperature of a rat is about 38° C. and its surface temperature is about 26° C.

Identifying and understanding the heat forms generated by the chemical heat means was considered an important factor since the internal reaction is conductive, the surface reading, is convective and the applicant observed that infra red is also emitted. This infrared was considered to play a role in the effectiveness of insect capture.

The following tests were undertaken:

Test 2.1

A 'Hot Pad' as obtained from SJC Corp, Korea was removed from the protective outer pack to initiate the chemical reaction. A probe thermometer was carefully pushed into the pad to measure core temperature. A second thermometer was placed on top of the pad to record the surface temperature. The test assembly was placed in a still air environment and readings were taken every hour.

Figure 2:
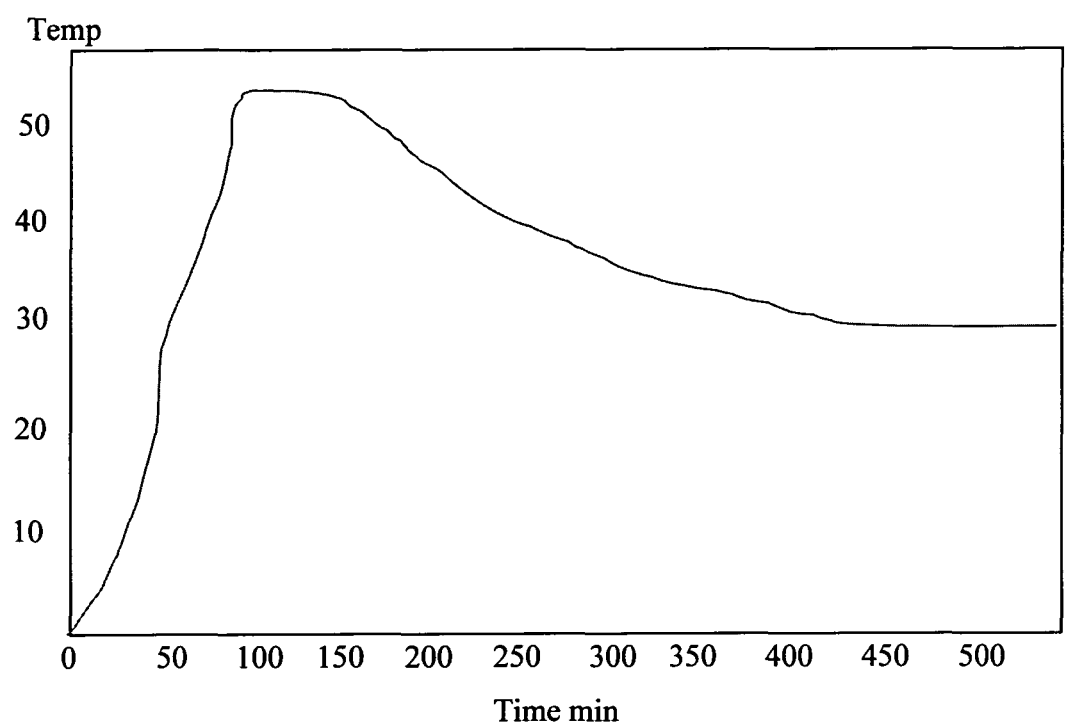
FIG. 2 is a graph (2.1) showing the change in core temperature of a chemical heat means following activation with time.

As can be seen from FIG. 2, (graph 2.1) the maximum core temperature of 53° C. was reached after 1-2 hours and the temperature was still around 30° C. after 8 hours, and in fact this temperature was maintained after 24 hours.

Whilst the pad increased in size after the trial, the post trial size was 80 mm×50 mm×20 mm compared to a starting size of 80 mm×50 mm×10 mm. There was no change in the weight of the sachet at the end of the trial. It could be that the increase in the weight of oxygen is offset by the water loss.

Test 2.2

Figure 3:
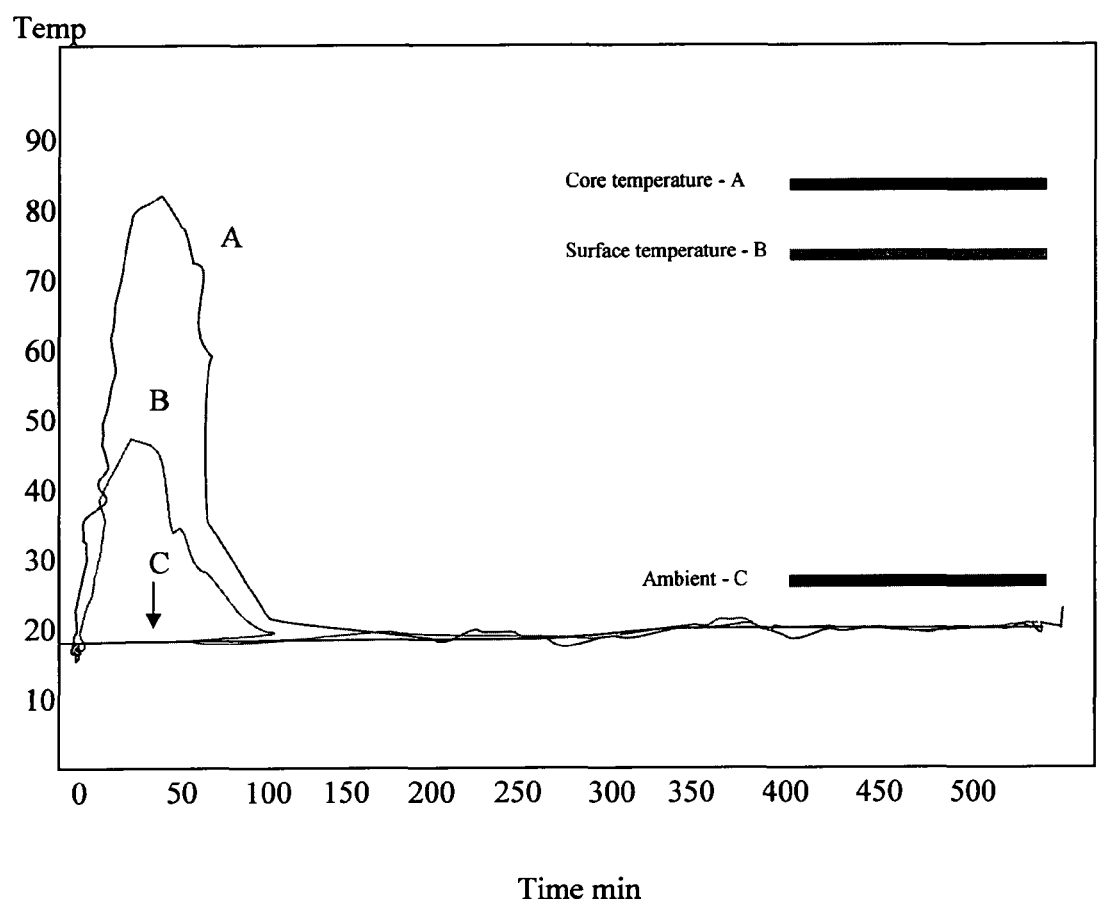
FIG. 3 is a graph (2.2) showing the change in core temperature and surface temperature of a chemical heat means following activation with time in the absence of a semi-permeable membrane.

An examination of the heat properties of the chemical formulation without the semi-permeable membrane was investigated. The same conditions as in test 2.1 were applied, except in this case the membrane was opened and the contents were poured onto an absorbent towel and then reshaped to resemble the dimensions of the original pad. As can be seen from FIG. 3 (graph 2.2), the maximum core temperature of 80° C. was reached after 30 minutes and the surface temperature reached 48° C. after 30 minutes. After 1.5 hours, the reaction had stopped and had returned to ambient.

These two tests (2.1 and 2.2) demonstrate the significance of the semi-permeable membrane in controlling the rate of reaction which relies on ingress of oxygen to initiate the reaction.

This next series of tests were aimed at establishing the effect that external factors could have on the reaction.

Test 2.3

It was assumed that it might be desirable to place the pad inside a traditional housing. In anticipation of this and to monitor what effect this could have on the reaction, the bag was placed in a small, virtually air tight, black plastics box measuring, 50 mm×50 mm×50 mm. (Black was chosen as the best radiation colour.) The test conditions were the same as for test 1.

Figure 4:
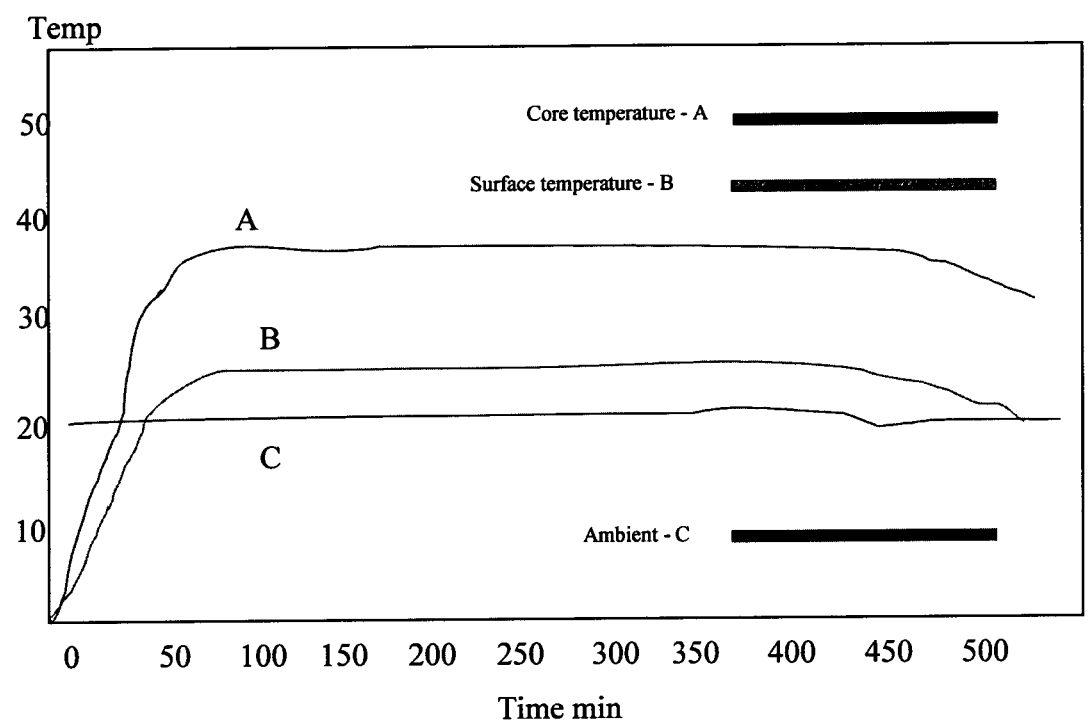
FIG. 4 is a graph (2.3) showing the change in core temperature and surface temperature of a chemical heat means following activation with time when the chemical heat means was placed in a small, virtually air tight, black plastics box.

As can be seen in FIG. 4 (graph 2.3) the core temperature only reached 36° C. and this was maintained for about 8 hours. The surface temperature reached 26° C. and was maintained for about 8 hours. Placing the pad in an enclosed space slows the reaction.

In view of this result and the observation that bed bugs are able to detect infrared, it was concluded that the final design should focus on a heat pad which was not essentially "closed" such that the beneficial infra red heat source was shielded and entry of air to the heat means was limited.

The design should preferably be such that:
(1) bed bugs can easily access the heat means;
(2) infra red heat emissions are not cut out by a closed housing; and
(3) sufficient air (oxygen) is available to the heat means to allow the chemical reaction to progress.

Test 2.4

In order to determine whether it was possible to increase the humidity beyond the levels achieved using water vapour generated from a standard "hot pad" a test was undertaken to establish the amount of water vapour (as humidity) that the "hot pad" would produce when activated without the presence of extra water.

As per test 1, the "hot pad" was removed from its protective wrapper to initiate the chemical reaction. A probe thermometer was placed inside the sachet to record the core temperature and a Pico hygrothermometer with a modified sampling head was placed directly on the surface of the sandwich to record the external temperature and humidity.

Figure 5:
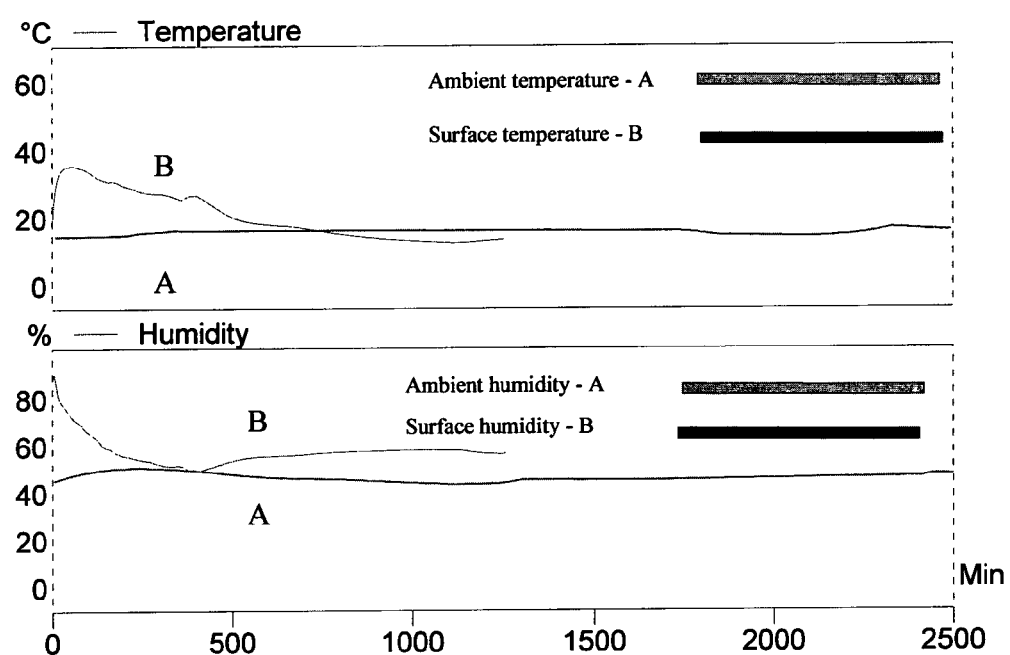
FIG. 5 is a graph (2.4.1) showing the change in surface temperature and humidity of a chemical heat means following activation with time in the absence of an added means of increasing humidity.

As can be seen in FIG. 5 (graph 2.4.1), the humidity drops to ambient after 5 hours. It is not known if this is optimum to attract bedbugs over the testing period, normally 8 hours.

In an attempt to raise the relative humidity generated by the "hot pad" for the duration of the test period the "hot pad" was placed between two pieces of foam rubber (moistened with 20 g of water (10 g per strip)) measuring 80 mm×50 mm×10 mm. The sandwich was held together with an elastic band and placed in the test chamber. A probe thermometer was placed inside the sandwich to record the core temperature and a Pico hygrothermometer with a modified sampling head was placed directly on the surface of the sandwich to record the external temperature and humidity.

Figure 6:
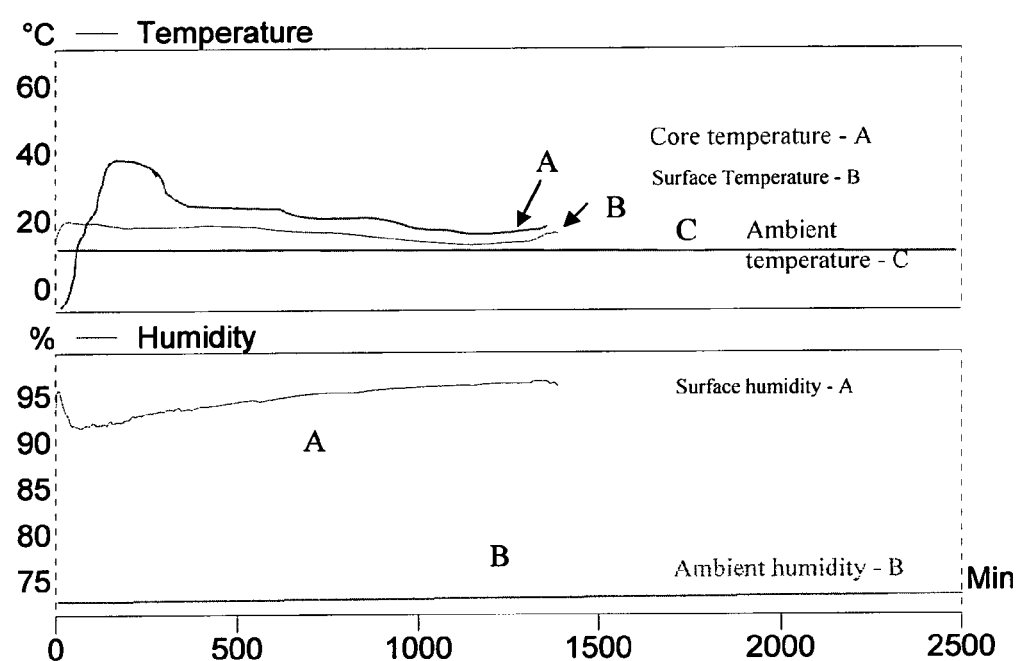
FIG. 6 is a graph (2.4.2) showing the change in core temperature, surface temperature and humidity of a chemical heat means following activation with time in the presence of an added means of increasing humidity.

As can be seen in FIG. 6 (graph 2.4.2), the core temperature rose to 42° C. after 2 hours and dropped to 21° C. after 20 hours. The humidity stayed above 90% RH during the period.

The experiment demonstrated that it is possible to control humidity by using a water holding material about the heating device. It may also be possibly to modify the content of the chemical heat means to generated additional water vapour.

Figure 7:
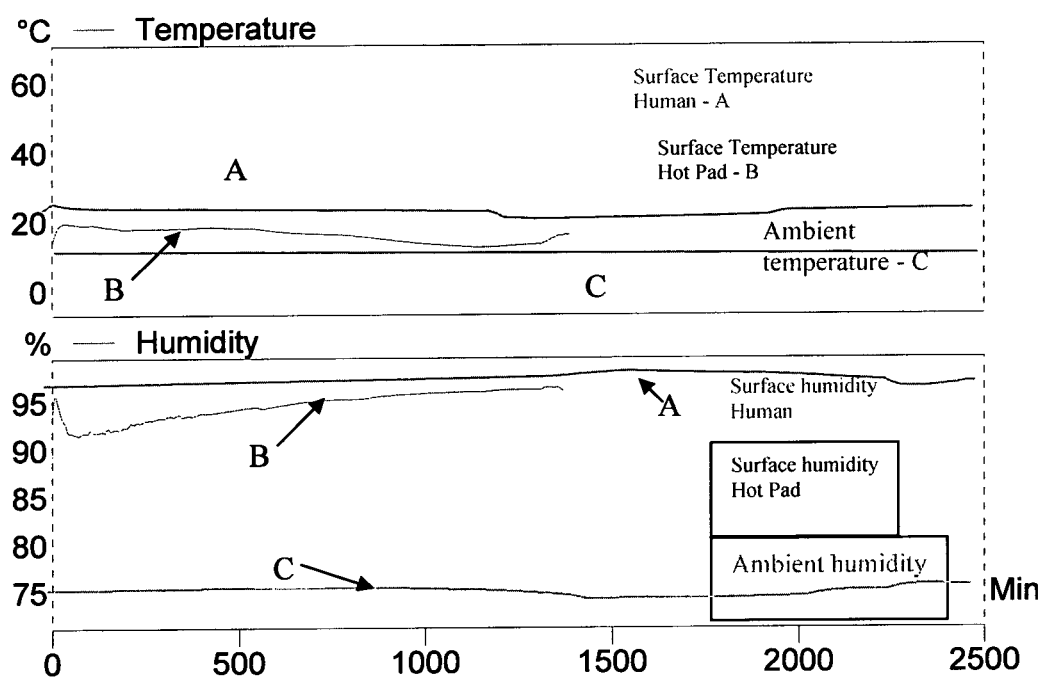
FIG. 7 is a graph (2.4.3) showing comparatively the surface temperature and humidity of a human arm pit.

This result closely mimics the physiology of a mammal. The average body surface temperature for a rat is 26° C. The humidity figure was unknown, so a comparative reading for a human was taken using a hygrothermometer fitted under a subjects arm for the testing period. As can be seen in FIG. 7 (graph 2.4.3) there is a correlation. Preferred humidity conditions are greater than 40% relative humidity, increasing in 10% amounts through 50%, 60%, 70%, and 80% to greater than 90%.

Tests were also conducted on other exothermic systems currently on the market. One such device, the Nurofen™ heat pad for back pain, uses the same chemistry as the 'Hot Pad' and performs similarly.

Conclusions

The results of these tests, together with the entomological studies undertaken, demonstrate that a chemical heat means which emits both water vapour and infrared heat can be used as an effective attractant in the design of a simple biting insect trap.

By designing and optimising a substantially open surround, in contrast to a substantially closed housing, about the heat means it is possible to achieve a trap which more closely "mimics a mammal" in a number of key characteristics which act as attractants—heat, humidity and infra red.

Figure 8:
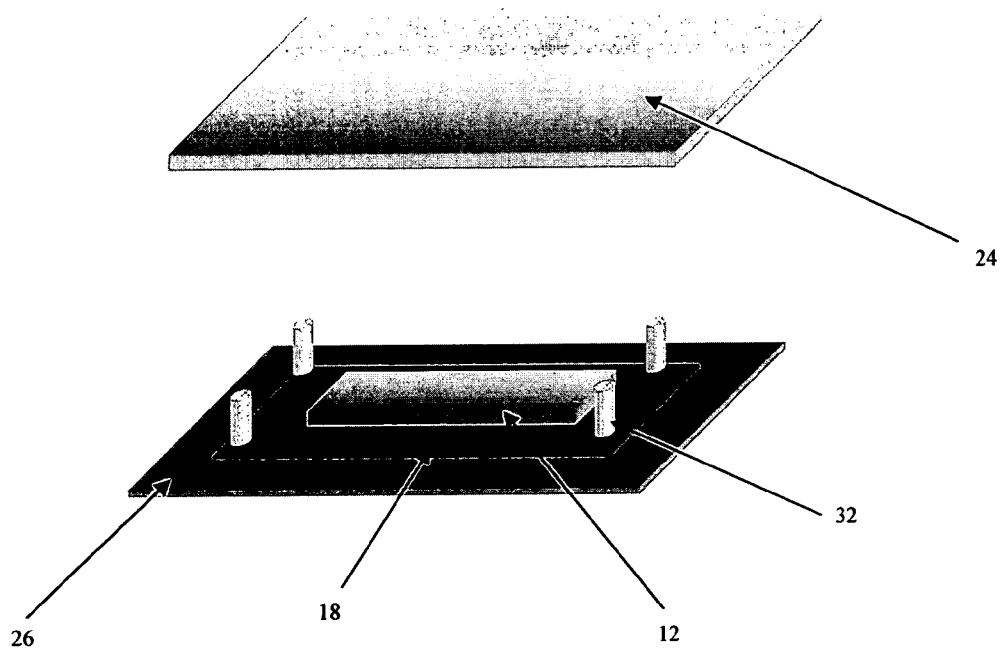
FIG. 8 is an exploded perspective view of a "flat pack" kit according to one aspect of the invention.

In a simple form a trap could take the form as illustrated in FIG. 8. In this embodiment, the trap takes the form of a "flat pack" kit. The chemical heat means (12) can be unsealed to initiate the reaction and placed over a retention surface (18) provided on a base (26). A cover (24) which is "open" can then be placed over the base which in the example illustrated is raised by supports (32). The cover (24) is designed to allow air into the trap and infrared heat to exit.

If additional humidity is required, a pad (30) or other water retaining means could be provided on or in the vicinity of the chemical heat means.

Such a trap could be a single use, disposable, device or alternatively refills of e.g. a glue board (18) and a chemical heat means (12) could be provided.

The mode of operation would be to remove the chemical heat means (12) from its package, place it in the middle of the sticky board (18) (if this area had glue on it, the pad would stick enabling the trap to be used on its side or upside down, if required) and the protective cover (24) placed on top, without making contact with the pad.

The trap would then be placed in the area to be monitored, preferably to be active overnight. The following day the traps can be removed for inspection whereupon the cover (24) can be removed to view the sticky board.

Any number of the devices could be placed in a room. It is possible that regular trapping in the same area could cause population depletion and thus the trap could become an effective method of control.

After use for monitoring or trapping, the device may be safely disposed of in the normal waste as there are no toxic or hazardous components.

Alternative designs of the trap are illustrated with reference to FIGS. 9 to 12.

Figure 9:
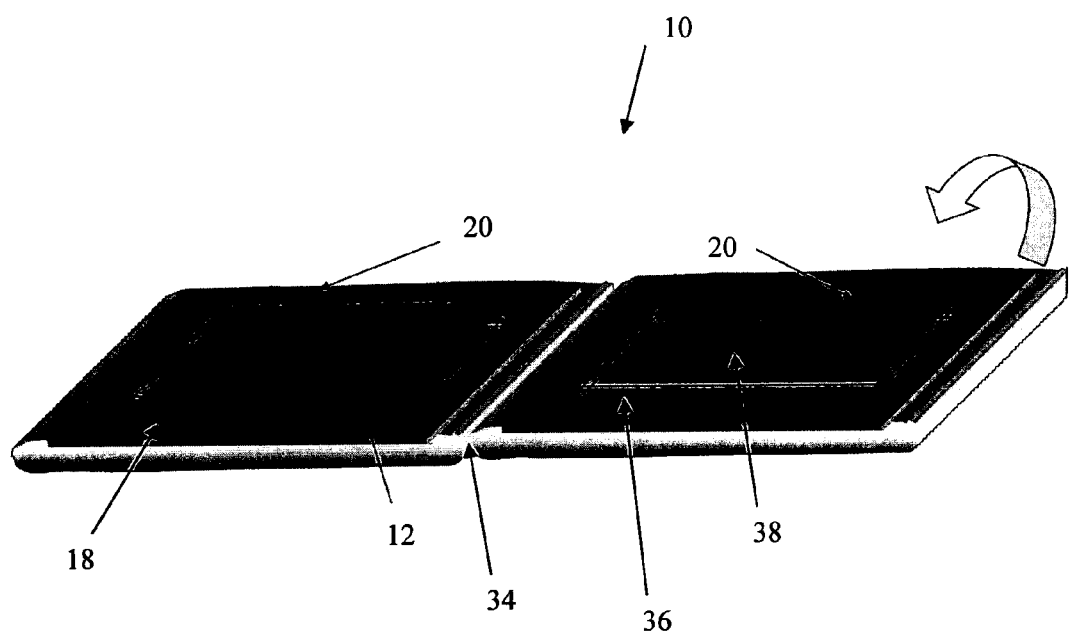
FIG. 9 is a perspective view of a further trap embodiment.

Referring to FIG. 9 there is disclosed a simple trap (10) comprising a surround (20) which is made of a porous material e.g. a ridged or soft foam or a sintered plastic and is consequently a substantially "open" structure. The casing is hinged (34) and it's innermost surfaces (36) are shaped to provide a recess (38) which will support a chemical heat means or pad (12). The whole of the innermost surfaces are coated with an adhesive (18) which can be used to stick the heat pad (18) to the trap and provide a trapping surface in the vicinity around the heat means (12).

Figure 10A:
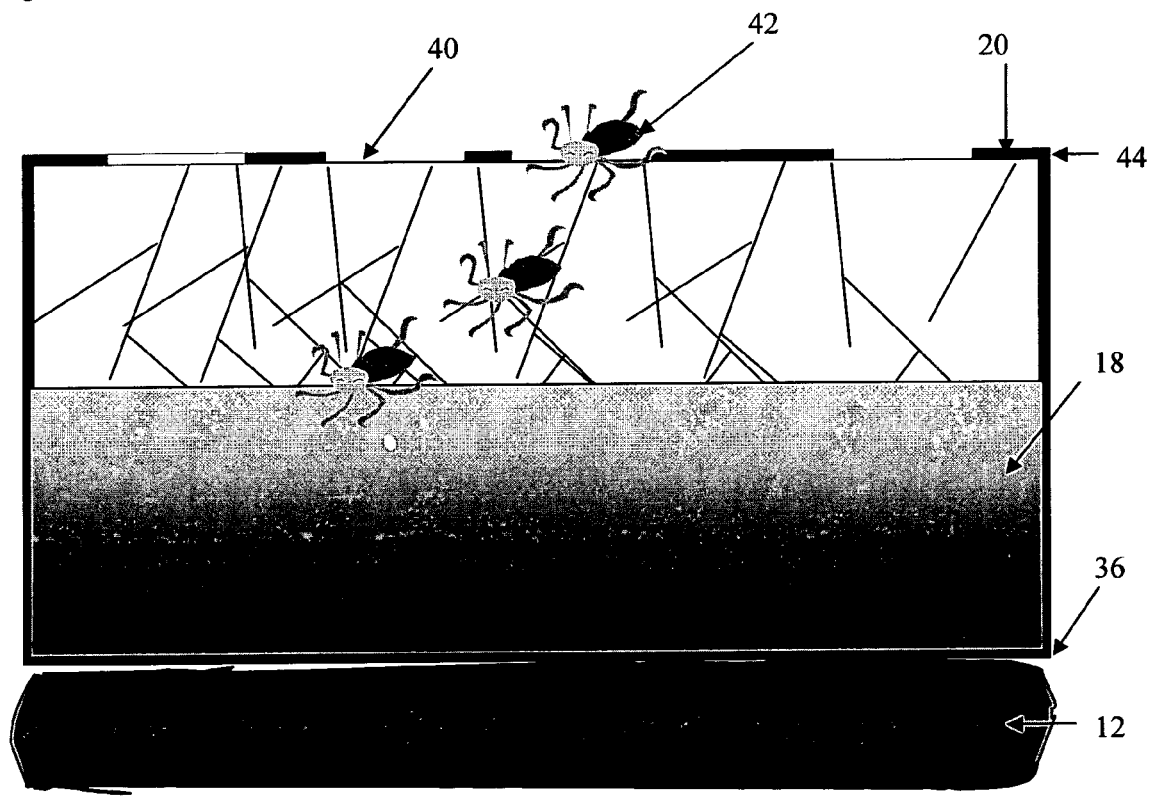
FIG. 10a is an illustration of an embodiment of trap with a porous surround which is partially impregnated with adhesive.
Figure 10B:
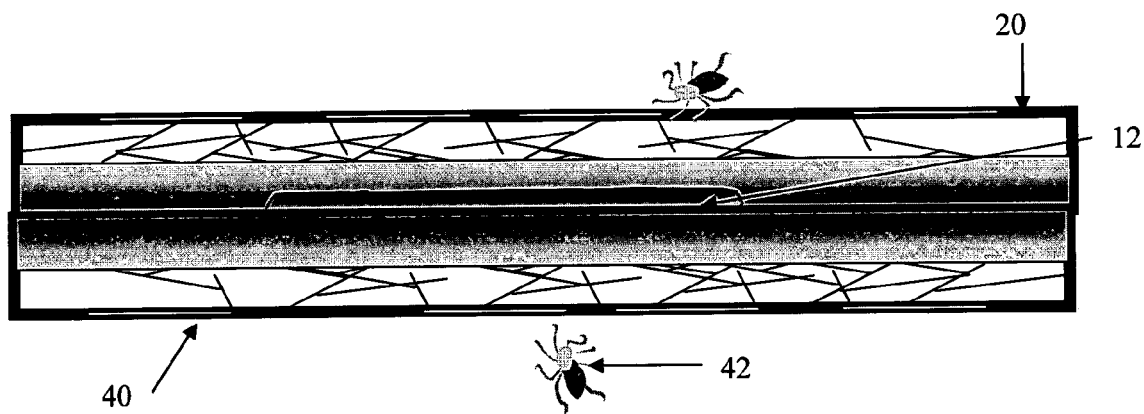
FIG. 10b is another illustration of an embodiment of trap with a porous surround which is partially impregnated with adhesive.

FIGS. 10a and 10b illustrate embodiments in which an "open" surround (20) is provided on one (FIG. 10a) or both (10b) sides of the chemical heat means (12). The surround (20) comprises an open substrate which may, for example, be a ridged or soft foam or a sintered plastic, with pores, channels or openings (40) which are wide enough to allow the easy passage of the insects (42). The substrate could be moulded to accommodate the heat pad (12). This open surround acts a little like animal fur/hair in that it provides an environment which may insulate the heat emitted from the chemical heat means, provide a micro environment which assists maintain a high humidity, provide an attractive surface for insects and, depending on the materials used, may provide a dark environment in which they can hide.

By including the insect trapping means as an adhesive within the substrate the trapping area is increased around the attractant as compared to a planar surface on which a heat means may traditionally be placed.

Furthermore, by having the adhesive (18) on or towards the innermost surface (36) of the substrate, as opposed to the outermost surface (44), the trap is not "sticky" to touch and the insects will be able to walk over it.

As the insects seek to get closer to the attractants they will enter through the holes (40) and become trapped in the adhesive. This will also mean that the device will not be covered in unsightly dead insects.

These configurations also allow access from all positions.

It is proposed that, preferably, the entire device is packaged in an air tight pack.

Such a trap could be packed, as a whole in an oxygen free pack such that once the pack is opened, the heating starts.

The trap may be used as a monitor or as a method of control. Preferably the substrate is coloured to contrast with the insect to be captured. White or yellow will enable easy examination of trapped insects.

Figure 11A:
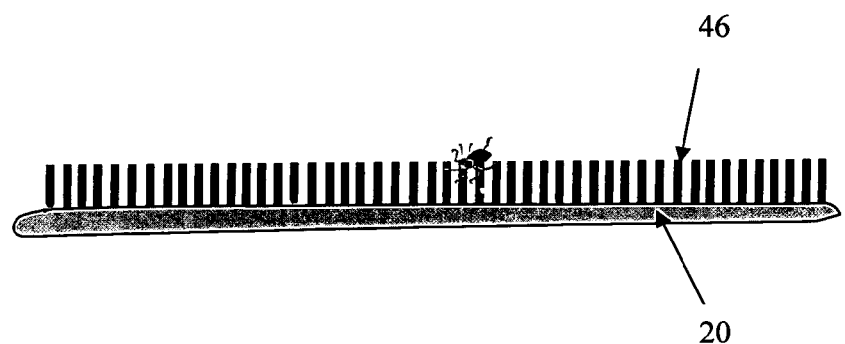
FIG. 11a illustrates a variation of trap in which the surround takes the form of a brush like structure.
Figure 11B:
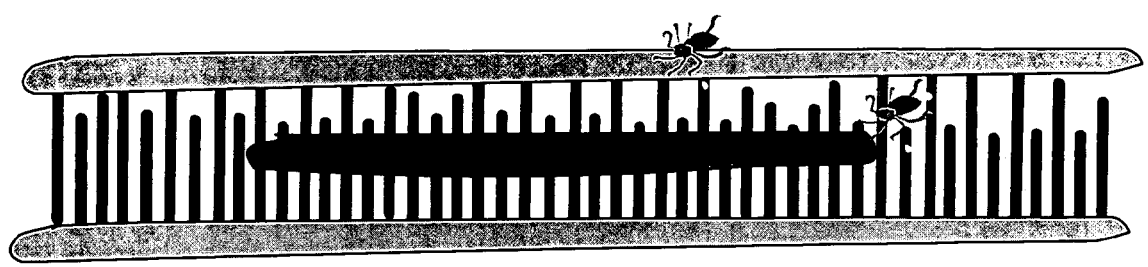
FIG. 11b illustrates a variation of a trap in which a brush-like structure completely envelops the heat means.

FIGS. 11a and 11b illustrates an embodiment wherein rather than a porous substrate the surround (20) takes the form of a substrate in which are embedded short natural or synthetic hairs, or hair like threads (46). Such a construction will offer the benefits previously discussed with reference to porous materials. Indeed, such a design may enable easier examination, and if the hairs are quite stiff, the outer surface will also not be sticky for the user to touch. An adhesive (18) can be incorporated intermediate the heat pad (12) and the outer surface (44) of the surround (20).

Further testing has led to further development of the product, such that the best mode is embodied by the trap illustrated in FIG. 12.

Referring to FIG. 12, the insect trap (10) comprises a base (22) and a cover (24) which sits over the base such that the perimeter (48) around the base defines one or more openings (40) (See FIG. 13a-c) defining what is termed hereafter as a "focus gap" (50) through which heat (including infrared) and humidity leaves the trap to draw insects thereto. The shape and size of this focus gap, (and the resulting heat/moisture emission signature) is, from the results obtained in trials, believed to play a significant role in it's effectiveness in, trapping, e.g. bed bugs, and the applicant further believes the principal is applicable to trapping other insect types, for example, fleas.

Thus, the substantially rectangular base (22) is a plate like structure comprising a plurality of raised supports (32), one at each corner which support the cover such that it is positioned above the base leaving an opening or small gap (50) at the base/cover interface (52) having a depth (d) of a few centimetres or less, say 0.3-1.8 cm, more preferably 0.6-1.2 cm. The focus gap which preferably runs around the whole perimeter may be open around substantially the whole of the perimeter (as in FIG. 13a) or broken, preferably in a regular manner, as illustrated in FIG. 12 (by projections (46)), (and FIGS. 13b and 13c) such that a characteristic heat (and moisture) signature (14'; 16') is emitted. Preferably, the emissions are limited to the focus gap (contrast FIGS. 13b and 13c).

The size and shape of the focus gap is also believed to be responsible for ensuring the inside of the trap remains sufficiently warm and moist for the desired capture period to serve it's attracting and trapping function.

The presence of thick, preferably regularly spaced, hair like, projections (46) around the perimeter help maintain a microclimate and they may additionally serve as attractants. Innermost of these projections (46) there is space for the mounting of an appropriate capture means (18) e.g. glue board and a chemical heat means (12).

The ability of the chemical heat means to generate sufficient heat (including infra red) and moisture for a sufficient period is important. Comparative Example 3 and Example 4, together with FIGS. 14a and 14b demonstrate the benefits of developing a chemical heat means for a given trap design.

Example 3

Standard Chemical Heat Means

| | |
|---|---|
| Iron powder | 50% |
| Activated Carbon | 25% |
| Sodium Chloride | 5% |
| Water | 20% |

Example 4

Modified Chemical Heat Means

| | |
|---|---|
| Iron Powder | 50% |
| Activated Carbon | 20% |
| Sodium Chloride | 5% |
| Water | 25% |

By increasing the presence of the water generating component (water) it was possible to achieve the desired controlled heat and humidity conditions and the resulting trap performance was excellent.

Thus, FIG. 14*b* shows that a standard chemical heat pad (water content 20%) is unable to generate an effective humidity, whereas the improved chemical heat pad (water content 25%) is able to generate significant humidity over a prolonged period of time (up to 24 hours)-FIG. 14*a*.

Referring to FIG. 14*a* it will be noted that, in contrast to FIG. 14*b* a heat/humidity signature (14'; 16') is achieved whereby the operating life of the trap is effectively extended by first using temperature to attract insects to the trap (which takes time) but as they get closer (and the temperature reduces—with time) then the relative humidity increases. In FIG. 14*a* the optimum trapping conditions are for the six hour period between 3 am and 9 am where the temperature was between 22 and 28° C. and the relative humidity was between 50 and 65% some 12-18 hours after initiation of the trap.

The benefits of heat and humidity (and the sinusoidal profile that can be generated), and the superior, performance achieved with a trap as per FIG. 12 in combination with the improved heat pad (Example 4) are demonstrated by the results attained in the further trials described below:

Trial A:—Product MRK1 (as Per FIG. 13*a*) and the Effect of Moisture.

Experiments were conducted, both in the laboratory and in the field (both residential and commercial sites), to try and determine the exact role of moisture in the process of attracting bed bugs.

In the case of the lab experiments two traps, with and without moisture pads, were placed in opposite corners of a larger testing arena. Then about 60 pre-starved females were, released from a position equidistant from both the traps. The experiment was performed over five days.

In field trials, two traps with and without moisture pads, were kept under opposite beds with a minimum distance of 5 ft there between. Again the trial was performed over five days.

Higher levels of bed bug infestation were noticed in both of the field trials (approx. 80-100 numbers counted in 30 min.)

The results of the experiments are summarised in Table 2 below:

TABLE 2

| | Number of bed bugs caught per trap in different trial | | | | | |
|---|---|---|---|---|---|---|
| | Lab trial | | Field trial-1 | | Field trial-2 | |
| Treatments | Total | Mean | Total | Mean | Total | Mean |
| With moisture pad | 52.00 | 10.40 | 99.00 | 19.80 | 45.00 | 9.00 |
| Without moisture pad | 31.00 | 6.20 | 56.00 | 11.20 | 17.00 | 3.40 |

Based on both laboratory and field trials it is clear that moisture is essential for attracting the bed bugs.

Though the activity of the bed bugs around the trap was high in all of the trials the catches were not proportionate.

Reduction in the bed bug population was not significant in spite of continuing the trapping for five days in the same place.

Having demonstrated that moisture, in addition to heat, was beneficial a further trial was conducted to compare the effect of trap design. (MK1—FIG. 13*a* and MK5—FIG. 13*b*). Brief details of this trial are given below:

Trial B

The MK5 trap (apertures around the perimeter and on the cover top) was tested in the field against the common bed bug, *Cimex lectularius* in comparison with the MK1 trap to assess the relative performance in terms of number of bed bugs caught in the trap. The units were assembled with and without a moisture pad and placed in bed room and study room. Observations were made on the number of bed bugs caught in the glue board/glued spines of the device with and without moisture pad. Each product version (with and without moisture) test was replicated five times. Among the different product versions tested, the MK1 trap was found to be very effective in terms of trapping the bugs compared to the MK5 trap. Fuller details are given below:

Methodology:

The trial was conducted to find out the relative performance of the different devices in terms of trapping the bugs. Both devices were assembled, one with moisture and the other without a moisture pad. The same glue, as used in laboratory studies, was used in the trial to paste the spines of the MK5 trap. Then all the units were placed in the bed room and study room with high bed bug populations and harbourages. The distance between the traps was about 5 ft. Each product version, with and without moisture, was replicated five times and each replication in the trial represents one set of experiments conducted on that particular night. (Five replications mean five set of experiments conducted on five continuous nights). All sets of experiments were started between 9.00-10.00 pm and continued until the next day morning 7.00-8.00 am. Observations were made on number of bed bugs caught on the adhesive pad/spines having glue in both the devices with and without moisture of both product versions.

Results:

The MK1 device was found to be very effective in terms of trapping the bugs compared to the MK5 version. The total number of bugs got caught from all the five traps together was 99.00 in the case of the MK1 device with moisture compared to just 3 in the case of the MK5 device with moisture.

The number of bugs caught in the trap of MK1 (39/trap with moisture) was the highest observed and interestingly, it included more than 90 percent of nymphs. The results are tabulated in Table 3 below:

TABLE 3

Relative performance of the MK1 and MK5 device against the Common bedbug, *Cimex lectularius* under field conditions

| | Total number of bedbugs caught in five replications | | | |
|---|---|---|---|---|
| Product Version | With moisture | Without moisture | Total | Mean |
| MK1 (Metal unit - FIG. 13a) | 90.00 | 39.00 | 129.00 | 64.50 |
| MK5 (FIG. 13b) | 03.00 | 05.00 | 08.00 | 04.00 |

Conclusion:

Based on the results it is clear that the additional apertures in the cover of the MK5 trap appeared to effect performance—possibly due to a lack of a "focal signature" and/or loss of heat/humidity.

A third trial, was conducted with a hybrid, MK9 device (FIG. 13c) which incorporated a focussed perimeter gap and a closed insulating cover, shaped to avoid condensation falling back into the trap which trap incorporated the improved chemical heat pad of Example 4, designed to provide an effective amount of moisture. The details of this trial are given below:

Trial C.

Both a laboratory and field experiment was conducted to evaluate the performance of the MK9 product with the new heat pad of Example 4. These experiments were again carried out with and without a separate moisture pad. More or less a similar percent of bed bugs were caught in both devices indicating the new chemical heat pad, designed to generate sufficient water vapour to humidify the trap, together with the revised trap design (insulating cover and focussed perimeter gap) achieved the objective.

Methodology:

For the laboratory studies, bed bugs (Cimex lectularius) were obtained from a culture maintained at Urban Entomology Cell (UEC), Bio-Control Research Laboratories (BCRL), Bangalore, Karnataka, India). Temperature and relative humidity during testing period ranged between 24-26° C. and 60-70% respectively. Forty female adults, starved for about one week, were released into the wooden box with a lot of provision made for bed bugs to hide and mimic their shelter, and the box was then placed inside the testing arena at one end. All the laboratory experiments started at 7.00 pm and continued to the next day morning 7.00 am.

The field (residential account), trial was conducted in a highly infested (approx. 100-150 numbers counted in 30 min.) single bedroom house (Hall 10×8.5 ft, Room 8×9 ft) to determine the performance of the MK9 device along with the improved chemical heat pad of Example 4. The respective traps (with and without moisture pads) were placed in the hall and bedroom. The distance between the traps was about 4-5 ft. Each treatment was replicated for 5 times and each replication in the trial represents one set of experiments conducted on that particular night. (Five replications mean 5 set of experiments conducted on five continuous nights). All the experiments were started between 9.00-10.00 pm and continued to the next morning between 7.00-8.00 am. The number of bed bugs caught in the traps was determined.

Results:

In contrast to all previous trials, the results between the with and without moisture pad were substantially similar suggesting that the new chemical heat pad (designed to generate effective levels of moisture, as well as heat) was effective. The results are shown in Tables 4 and 5 below:

TABLE 4

Laboratory efficacy of a modified trap (MK 9 with Example 4 chemical heat pad) against Common Bed Bug, Cimex lectularius with and without moisture pad under larger testing arena.
Mean number of bed bugs attracted and caught in the device

| With moisture pad | | | | Without moisture pad | | | |
| --- | --- | --- | --- | --- | --- | --- | --- |
| No. attracted | Percent attracted | No. caught | Percent caught | No. attracted | Percent attracted | No. caught | Percent caught |
| 18.80 | 47.00 | 10.40 | 26.00 | 19.60 | 49.00 | 8.80 | 22.00 |

TABLE 5

Field evaluation of a modified trap (MK 9 with Example 4 chemical heat pad) against Common Bed Bug, Cimex lectularius with and without moisture pad.

| | Number of bedbugs caught from single traps in different replication | |
| --- | --- | --- |
| Treatments | Total | Mean |
| With moisture | 171 | 19 |
| Without moisture | 208 | 23.11 |

Conclusion:

The results suggest that the modified chemical heat pad generated sufficient humidity to prove effective and that the resulting heat (FIG. 13c and FIG. 14a) and moisture signature (FIG. 14a) is highly effective when used in a trap with an insulating cover and a perimeter focus gap.

The invention claimed is:

1. A trap for bed bugs, which mimics certain characteristics of a mammal, and comprises:
    a housing comprising a base and a cover containing a heater, generating an infrared heat source;
    a water vapour generator;
    a plurality of projections disposed on the base, wherein the heater is mounted on the projections to define a gap between the base and the heater; and
    an insect retention surface characterized in that the cover is positioned over the base to define an opening between the base/cover interface, the opening extending from the base and having a depth (d) of less than 1.5cm; and
    the opening is sized and positioned such that at least two attractant signals are directed out of the opening in a manner allowing effective operation for at least 8 hours, wherein at least two of the attractant signals are comprised, respectively, of heat and water vapour.

2. The trap of claim 1, further comprising a microclimate enhancing surround disposed peripherally about the heater, wherein the surround includes a plurality of peripheral projections extending from at least one of the base and cover to define a focus gap between two adjacent projections, the surround configured to at least one of imitate animal fur, insulate emitted heat, and insulate water vapor to maintain a humid environment.

3. The trap of claim 2, wherein at least one peripheral projection is impregnated with at least one of water, an insect capture adhesive and an insecticide.

4. The trap of claim 1, wherein the cover is comprised of an insulating material.

5. A trap for bed bugs, which mimics certain characteristics of a mammal, and comprises:
    a heater;
    a water vapor generator;

an insect retention surface; and a plurality of projections disposed about the heater, wherein the heater rests on the projections to raise the heater above the insect retention surface;

wherein said heater includes a packaged chemical heat pad surrounded by an air tight protective packaging, the chemical heat pad includes a semi permeable membrane filled with chemicals including at least a bound water source and components configured to release the bound water source, the bound water source comprising, by weight, at least 21 percent of the chemical heat pad, and wherein the chemicals automatically, on activation by oxygen following the removal of the protective packaging generate an infrared heat and water vapor, the water vapor generating a relative humidity of at least 60 percent.

6. The trap according to claim 5, wherein the chemicals include at least one of an iron powder, an activated carbon, and a catalyst sodium chloride.

7. The trap according to claim 5, wherein the chemical heat pad includes materials which slow the rate of reaction.

8. The trap according to claim 7, wherein the chemical heat pad which slow the rate of reaction include at least one of charcoal and zeolite.

9. The trap according to claim 5, wherein the bound water source comprises, by weight, 25 percent of the chemical heat pad.

10. The trap according to claim 9, wherein the components which release bound water include at least one of cellulose, zeolite and sodium chloride.

11. The trap according to claim 5, further comprising a microclimate enhancing surround disposed about the heater, wherein the surround is configured to at least one of imitate animal fur, insulate emitted heat, and insulate water vapor to maintain a humid environment.

12. The trap according to claim 11, wherein the surround includes at least one of a base and cover.

13. The trap according to claim 12, wherein the surround contains at least one of pores, channels and openings.

14. The trap according to claim 13, wherein the heater generates a surface temperature of about 25° C. for a predetermined time period sufficient to attract a biting insect thereto.

15. The trap according to claim 14, wherein the time period is for at least 8 hours.

16. The trap according to claim 12, wherein the cover is positioned over the base such that it defines an opening between a base/cover interface, the opening has a depth (d) of less than 1.5cm; and the opening is sized and positioned such that at least one attractant signal is directed out of the opening in a manner allowing effective operation for at least 8 hours.

17. The trap according to claim 16, wherein the opening extends around a perimeter of the trap.

18. The trap of claim 12, wherein the cover is comprised of an insulating material.

19. The trap according to claim 5, wherein the insect retention surface surrounds the heater.

20. A method, comprising: at least one of monitoring and trapping bed bugs, wherein the method uses at least one chemical to generate, in combination, heat, humidity and an infrared as attractants, said chemical being retained in a packaged chemical heat pad including a chemical heat pad surrounded by an air tight protective packaging, which the chemical heat pad includes a semi-permeable membrane filled with chemicals, the chemicals including at least a bound water source comprising, by weight, at least 21 percent of the chemical heat pad, wherein the chemicals automatically, on activation by oxygen following the removal of the protective packaging, generate both infrared heat and water vapor, wherein the infrared heat generates a surface temperature of about 25° C. and the water vapor generates a relative humidity of at least 60 percent, the temperature and humidity lasting for a predetermined time period of at least 8 hours; and mounting the packaged chemical heat pad on a plurality of projections extending from a base to define a gap between the packaged chemical heat pad and the base.

* * * * *